(12) United States Patent
Ito et al.

(10) Patent No.: US 6,510,828 B2
(45) Date of Patent: Jan. 28, 2003

(54) MOUNTING DEVICE OF CAM CHAIN GUIDE

(75) Inventors: Katsuhiko Ito, Saitama (JP); Ken Oike, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 56 days.

(21) Appl. No.: 09/851,971

(22) Filed: May 10, 2001

(65) Prior Publication Data

US 2002/0002091 A1 Jan. 3, 2002

(30) Foreign Application Priority Data

May 10, 2000 (JP) .......................................... 2000-137267

(51) Int. Cl.[7] ............................................... F02B 67/06
(52) U.S. Cl. ............................... 123/90.31; 123/195 R; 474/140; 474/150
(58) Field of Search ...................... 123/90.31, 90.17, 123/195 R, 195 A, 198 R; 474/140, 150

(56) References Cited

U.S. PATENT DOCUMENTS

| | | | | |
|---|---|---|---|---|
| 4,971,000 A | * | 11/1990 | Shimura et al. | ......... 123/90.31 |
| 5,366,418 A | * | 11/1994 | Fukusima et al. | .......... 474/111 |
| 6,213,073 B1 | * | 4/2001 | Iwata | ...................... 123/90.38 |
| 6,250,268 B1 | * | 6/2001 | Iwase et al. | ............. 123/90.31 |
| 6,308,679 B1 | * | 10/2001 | Nakamura et al. | ...... 123/195 R |

* cited by examiner

*Primary Examiner*—Weilun Lo
(74) *Attorney, Agent, or Firm*—Birch, Stewart, Kolasch & Birch, LLP

(57) ABSTRACT

To improve a mounting configuration for a chain guide of a cam chain for transmitting power to a power system of an internal combustion engine to make mounting of a chain guide and a cylinder block simple and easy. A mounting device for a cam chain guide for an internal combustion engines constructed such that rotation of a crank shaft is transmitted to a cam shaft provided externally of a cylinder bore by a cam chain 3 to operate an intake/exhaust valve through a push rod and a rocker arm. A first protrusion provided in the vicinity of a lower end of a chain guide is fitted into a first locating groove provided in the vicinity of a crank shaft of a crank casing, and a second protrusion provided in the vicinity of an upper end of a chain guide is fitted into a second locating groove provided in a lower surface of a cylinder block and gradually enlarged from a protrusion fixed position toward an opening.

18 Claims, 8 Drawing Sheets

MOUNTING DEVICE OF CAM CHAIN GUIDE

BACKGROUND OF THE INVENTION

1. Field of the Invention

The present invention relates to a mounting configuration for a chain guide of a cam chain for transmitting power to a power valve system of an internal combustion engine.

2. Description of Background Art

FIG. 13 is a front view showing one example of a cam chain and a chain guide of an internal combustion engine according to the background art. A cam chain 03 is stretched over between a crank shaft sprocket 01 and a cam shaft sprocket 02 to transmit rotation of a crank shaft 01a to a cam shaft 02a. Numeral 04 designates a crank casing; 05 is a cylinder block; 06 is a cylinder head; and 07 is a head cover. These components are fixedly assembled in sequence.

Numeral 08 designates a chain guide disposed along the cam chain 03. A first protrusion 08a is provided on a lower end of the chain guide 08 and is fitted into a first locating groove 09 provided in the vicinity of the crank shaft 01a in the crank casing 04. Furthermnore, a second protrusion 08b is provided at an upper part of the chain guide 08 and is fitted into a second locating groove 010 provided in an upper surface of the cylinder block 05. Numeral 011 designates a chain tensioner disposed along the cam chain 03 at a position opposite to the chain guide 08. A lower end of the chain tensions 011 is pivotally supported by a shaft 011a, and an upper part of the chain tensions 011 is pressed against the cam chain 03 by a hydraulic device 012 so as to suppress looseness of the cam chain 03.

In an overhead valve system, a cam shaft is provided externally of a cylinder bore to operate a intake/exhaust valve through a push rod and a rocker arm by rotation of the cam shaft. Since a position of the cam shaft is low and is greatly displaced from a portion of the internal combustion engine directly above the crank shaft, it is difficult to provide a chain guide locating groove in the upper surface of the cylinder block. Furthermore, since the rotational direction of the cam chain, i.e., the longitudinal direction of the chain guide is deviated from the vertical direction, if the chain guide is fixed in advance when the cylinder block is mounted along a stud bolt embedded in the crank casing, the upper end of the chain guide interferes with the inner wall of the cylinder block so that the cylinder block cannot be mounted.

SUMMARY OF THE INVENTION

For solving the above-described problem, the present invention provides a mounting device for a cam chain guide for an internal combustion engine, wherein rotation of a crank shaft is transmitted to a cam shaft provided externally of a cylinder bore by a cam chain to operate a supply-exhaust valve through a push rod and a rocker arm. In addition, a first protrusion provided in the vicinity of a lower end of a chain guide is fitted into a first locating groove provided in the vicinity of the crank shaft in a crank casing, and a second protrusion provided in the vicinity of an upper end of the chain guide is fitted into a second locating groove provided in a lower surface of a cylinder block of the internal combustion engine. The second locating groove is gradually enlarged from an inner position toward the opening thereof.

According to the present invention configured as described above, since the second locating groove is provided in the lower surface of the cylinder block, even if the position of the cam shaft is low and greatly deviated from a portion of the internal combustion engine directly above the crank shaft, the position of the upper locating groove can be freely selected. Furthermore, since the second locating groove is gradually enlarged toward the opening from an inner fixed position of the second protrusion of the chain guide, when the chain guide and the cylinder block are mounted, the protrusion can be easily inserted into the locating groove after passing by the location of interference with the cylinder block and therefore making mounting simple.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
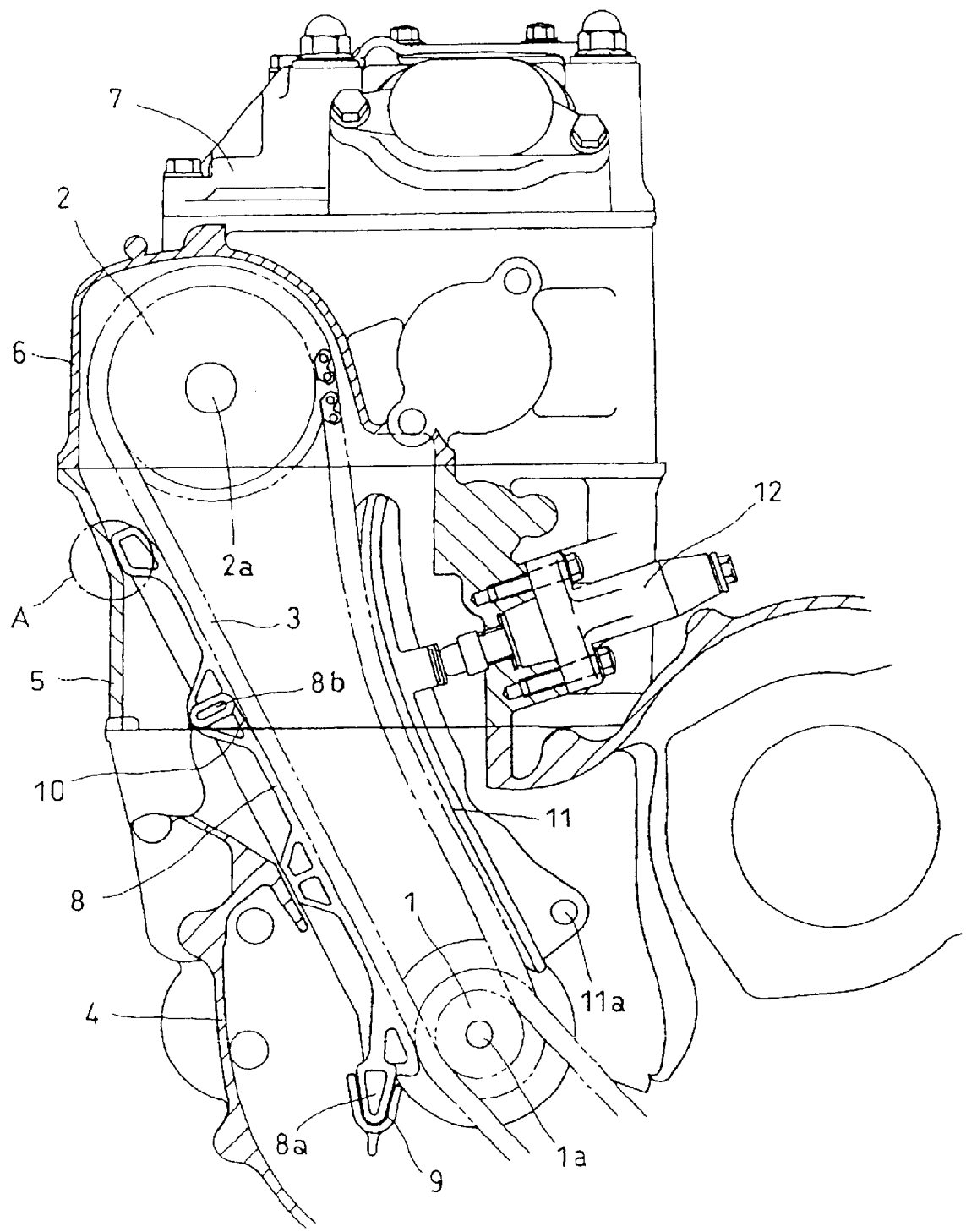
FIG. 1 is a front cross-section at a position of a cam chain and a chain guide illustrating a portion of an internal combustion engine, to which one form of the present invention is applied.
Figure 2:
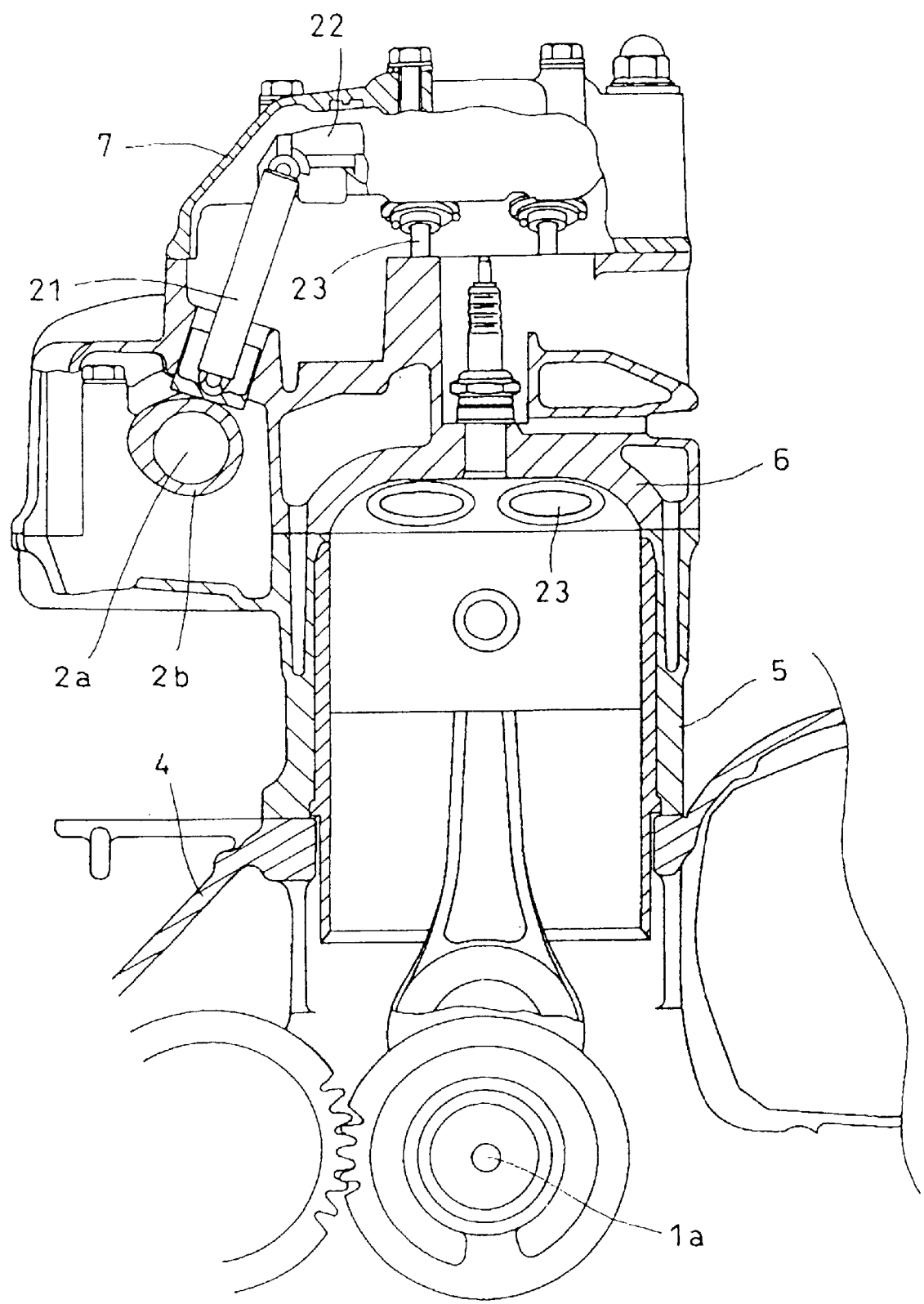
FIG. 2 is a front cross-section at a position of a piston of the internal combustion engine of the present invention.
Figure 3:
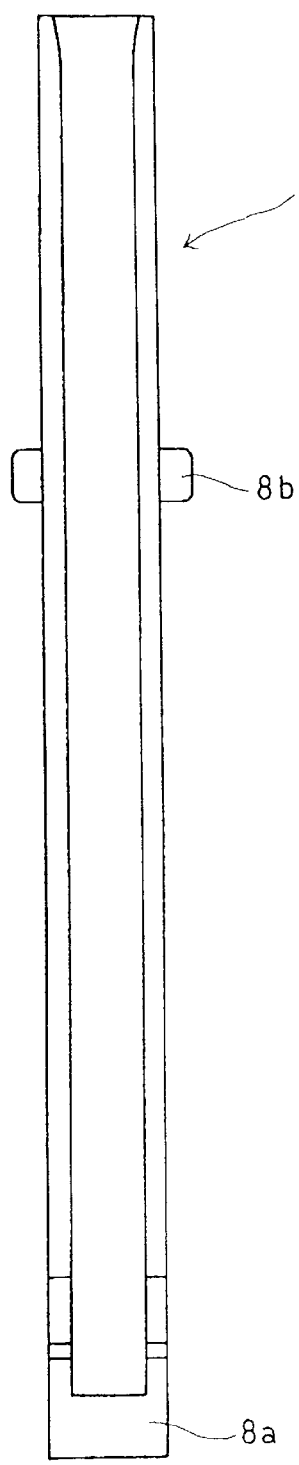
FIG. 3 is a front view illustrating a chain guide according to the present invention.
Figure 4:
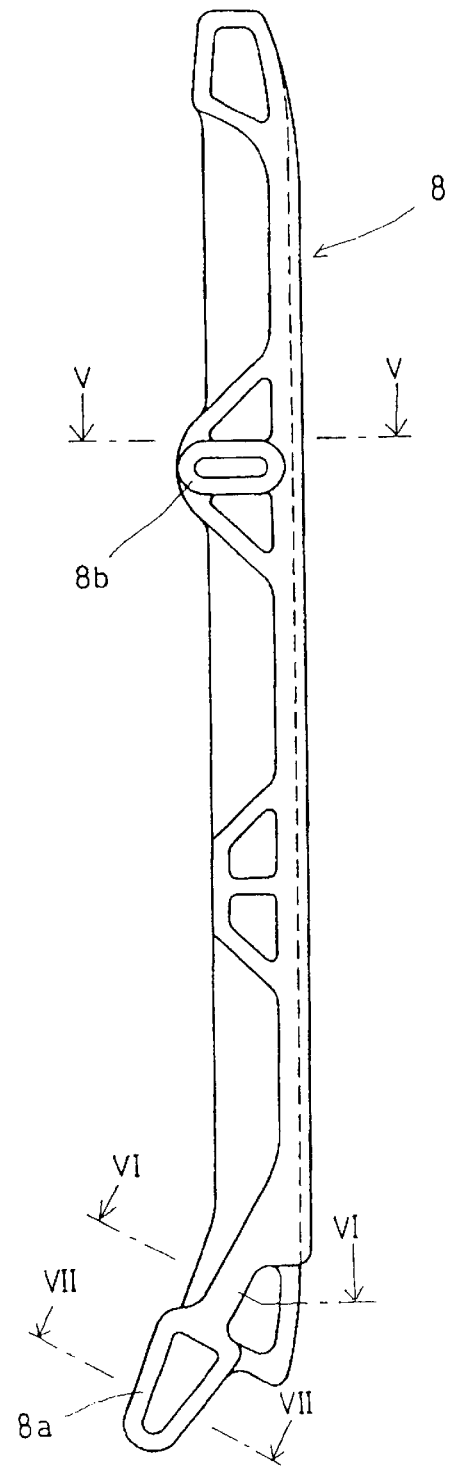
FIG. 4 is a side view illustrating the chain guide according to the present invention.
Figure 5:
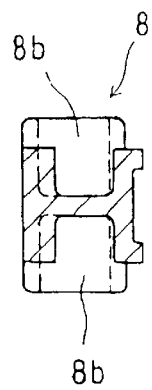
FIG. 5 is a sectional view taken on line V—V of FIG. 4.
Figure 6:
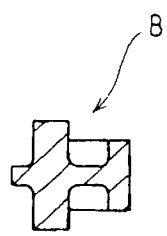
FIG. 6 is a sectional view taken on line VI—VI of FIG. 4.
Figure 7:
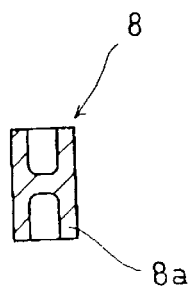
FIG. 7 is a sectional view taken on line VI—VI of FIG. 4.
Figure 8:
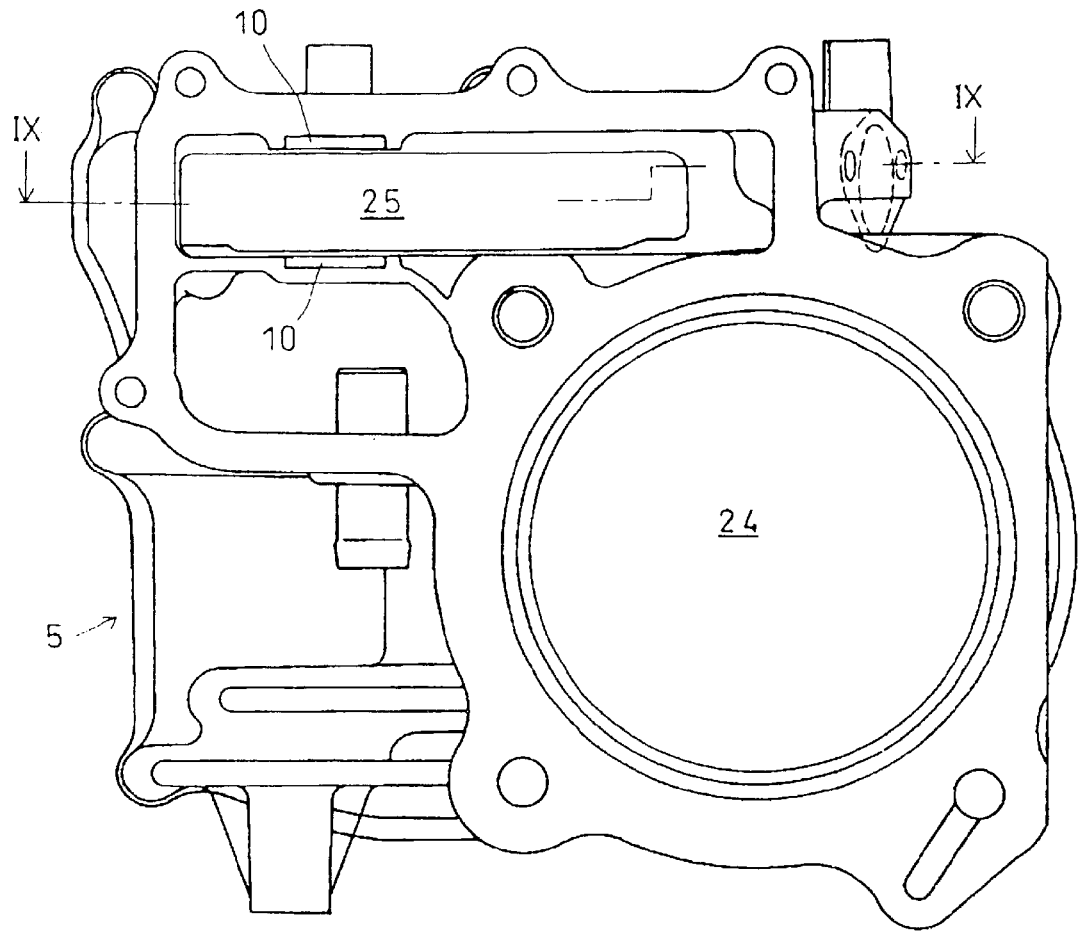
FIG. 8 is a bottom view illustrating a cylinder block according to the present invention.
Figure 9:
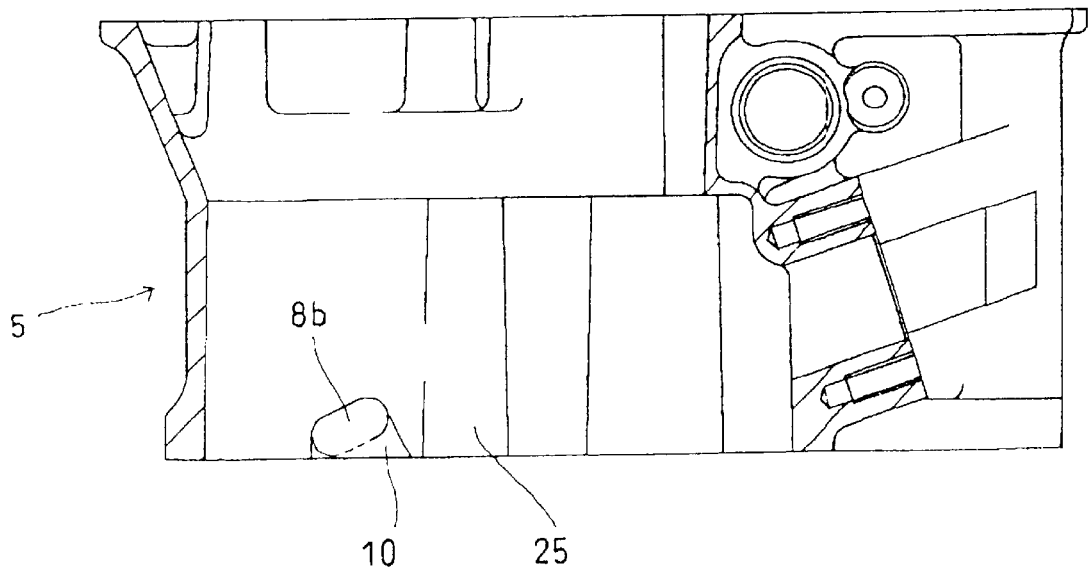
FIG. 9 is a sectional view taken on line IX—IX of FIG. 8.

FIG. 1 is a front cross-section at a position of a cam chain and a chain guide illustrating a portion of an internal combustion engine, to which one form of the present invention is applied, and FIG. 2 is a front cross-section at a position of a piston of the internal combustion engine of the present invention. FIG. 3 is a front view illustrating a chain guide according to the present invention, FIG. 4 is a side view, FIG. 5 is a sectional view taken on line V—V of FIG. 4, FIG. 6 is a sectional view taken on line VI—VI of FIG. 4, and FIG. 7 is a sectional view taken on line VII—VII of FIG. 4. FIG. 8 is a bottom view illustrating a cylinder block according to the present invention, and FIG. 9 is a sectional view taken on IX—IX of FIG. 8.

First, in FIGS. 1 and 2, a cam chain 3 is stretched over between a crank shaft sprocket 1 and a cam shaft sprocket 2 to transmit rotation of a crank shaft 1a to a cam shaft 2a. Numeral 4 designates a crank casing; 5 is a cylinder block; 6 is a cylinder head; and 7 is a head cover. The above components are fixedly assembled in sequence.

The present invention employs a so-called overhead valve system, in which the cam shaft 2a is provided externally of a cylinder bore, and an intake/exhaust valve 23 is operated through a push rod 21 and a rocker arm 22 by rotation of a cam 2b. Accordingly, a position of the cam shaft 2a is low and greatly deviated from a portion of the internal combustion engine directly above the crank shaft 1a. The rotational direction of the cam chain 3 is deviated from the vertical direction. A chain guide 8 is disposed along the rotational direction.

The shape of the chain guide 8 is illustrated in FIGS. 3 to 7. A first protrusion 8a and a second protrusion 8b are provided on the lower end and upper portion, respectively, of the chain guide 8. The first protrusion 8a is directed substantially vertically downward when the chain guide 8 is mounted. The second protrusion 8b is protruded from both sides of the upper portion of the chain guide 8.

A first locating groove 9 is provided in the vicinity of the crank shaft 1a of the crank casing 4. The first protrusion 8a is fitted into the first locating groove 9. Furthermore, a second locating groove 10, into which the second protrusion 8b is a fitted, is provided in the lower surface of the cylinder block 5, as shown in FIGS. 8 and 9. The second locating groove 10 is gradually enlarged toward an opening from an inner fixed position of the second protrusion 8b, as will be apparent from FIG. 9. In FIG. 8, numeral 24 designates a cylinder bore; and 25 is a chain chamber.

Furthermore, in FIG. 1, numeral 11 designates a chain tensions disposed along the cam chain 3 at a position opposite to the chain guide 8, the chain tensions having a lower end pivotally supported by a shaft 11a. The upper portion of the chain tensions 11 is pressed against the cam chain 3 by a hydraulic device 12 to suppress looseness of the cam chain 3.

A mounting method for the chain guide 8 and the cylinder block 5 will be described hereinafter. The longitudinal direction of the chain guide 8 in the present invention is greatly deviated from the vertical direction similar to the rotational direction of the cam chain 3. Accordingly, when the chain guide 8 is already fixed at a predetermined position, when the cylinder block 5 is mounted vertically upward along a stud bolt embedded in the crank casing 4, the upper end of the chain guide 8 interferes with the inner wall of the cylinder block 5 so that the cylinder block 5 cannot be mounted.

Figure 10:
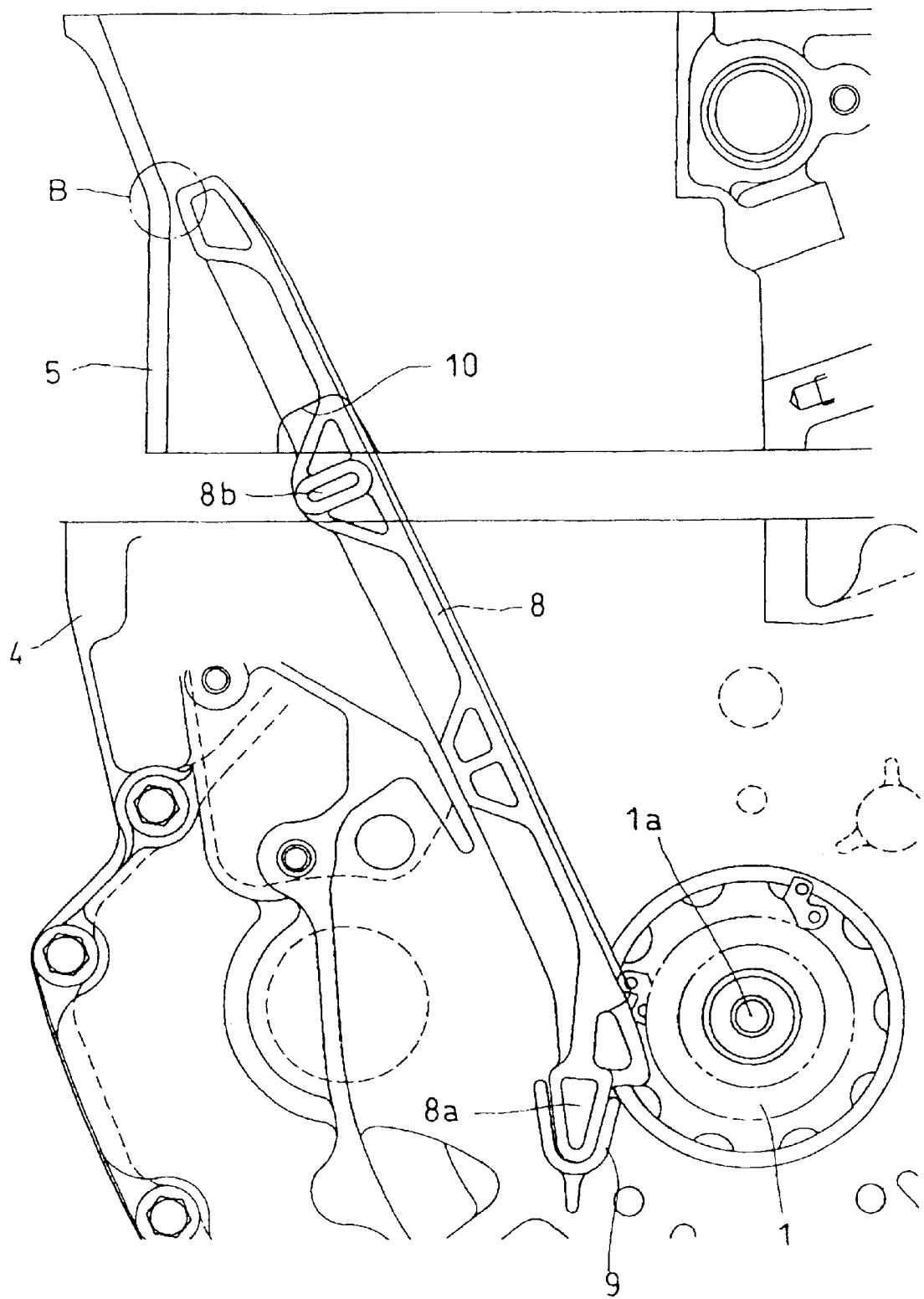
FIG. 10 is a view illustrating a first stage for mounting a chain guide and a cylinder block according to a method of the present in the present invention.

Therefore, in the present invention, the chain guide 8 and the cylinder block 5 are assembled in the following manner. First, as shown in FIG. 10, the first protrusion 8a is inserted into the first locating groove 9, the chain guide 8 is stood upright somewhat vertically to escape inwardly of the wall of the cylinder block 5, and the cylinder block 5 is hung down to let it pass through a narrow space B.

Figure 11:
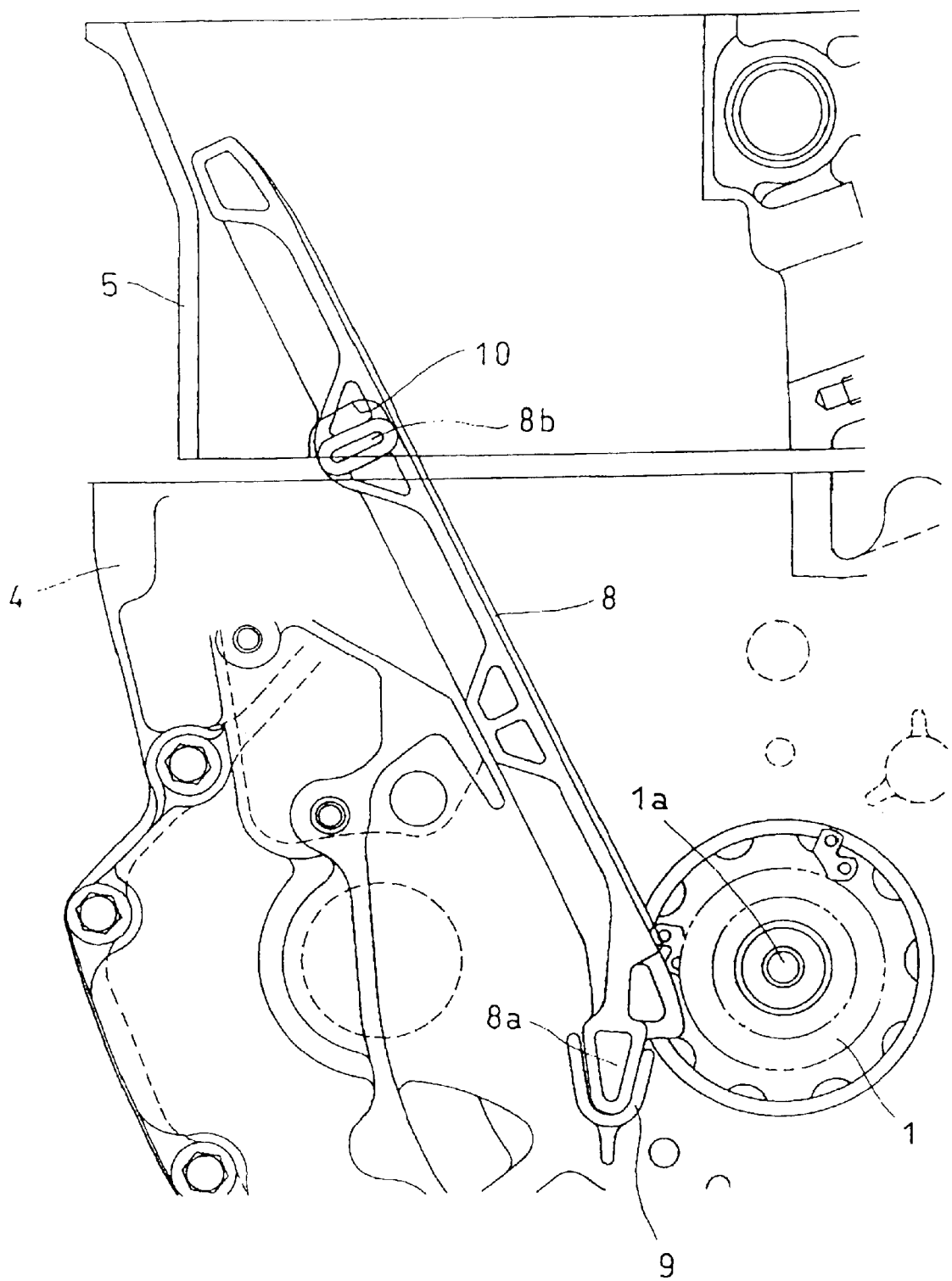
FIG. 11 is a view illustrating a second stage for mounting the chain guide and the cylinder block according to the method of the present invention.
Figure 12:
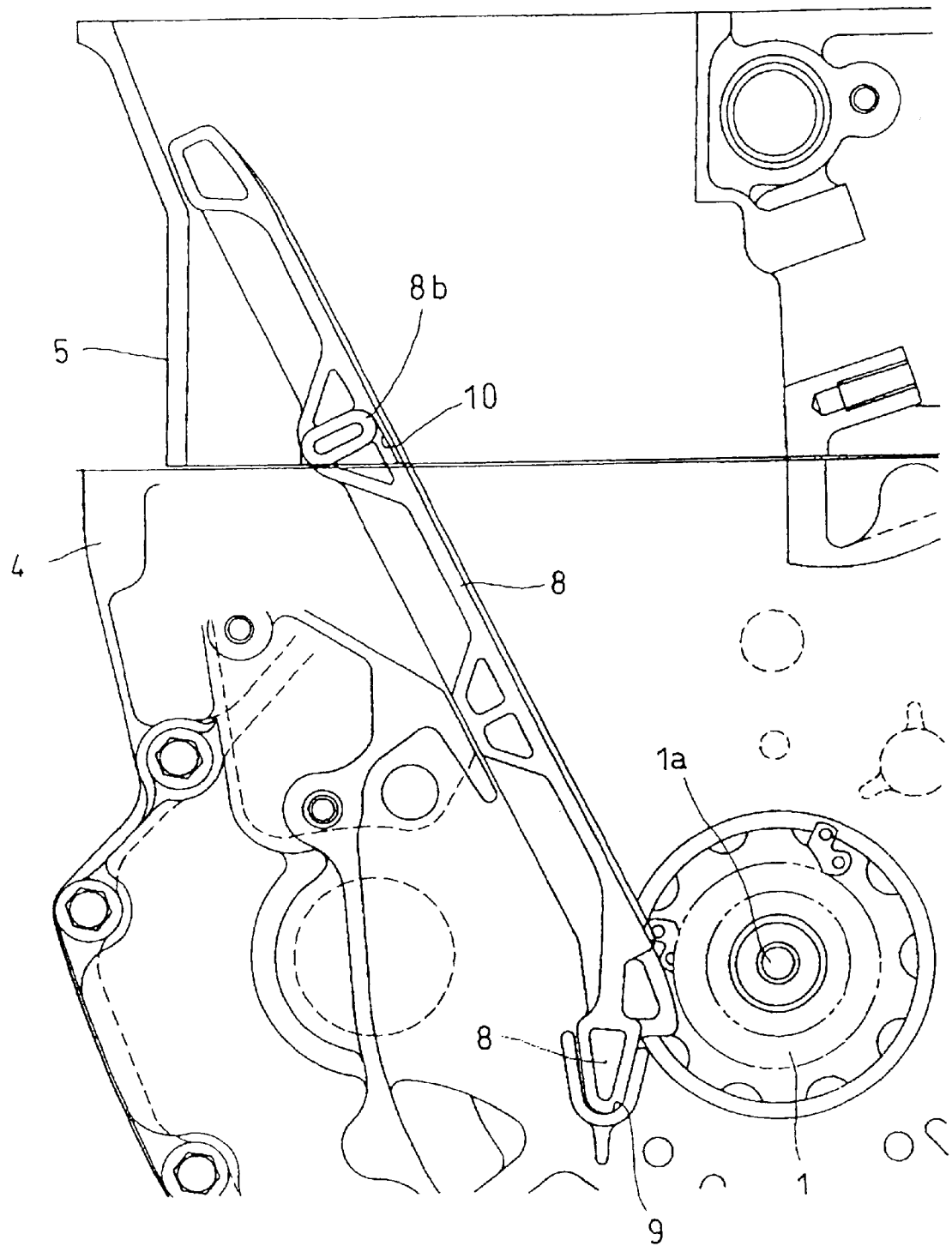
FIG. 12 is a view illustrating a final stage for mounting the chain guide and the cylinder block according to the method of the present invention.
Figure 13:
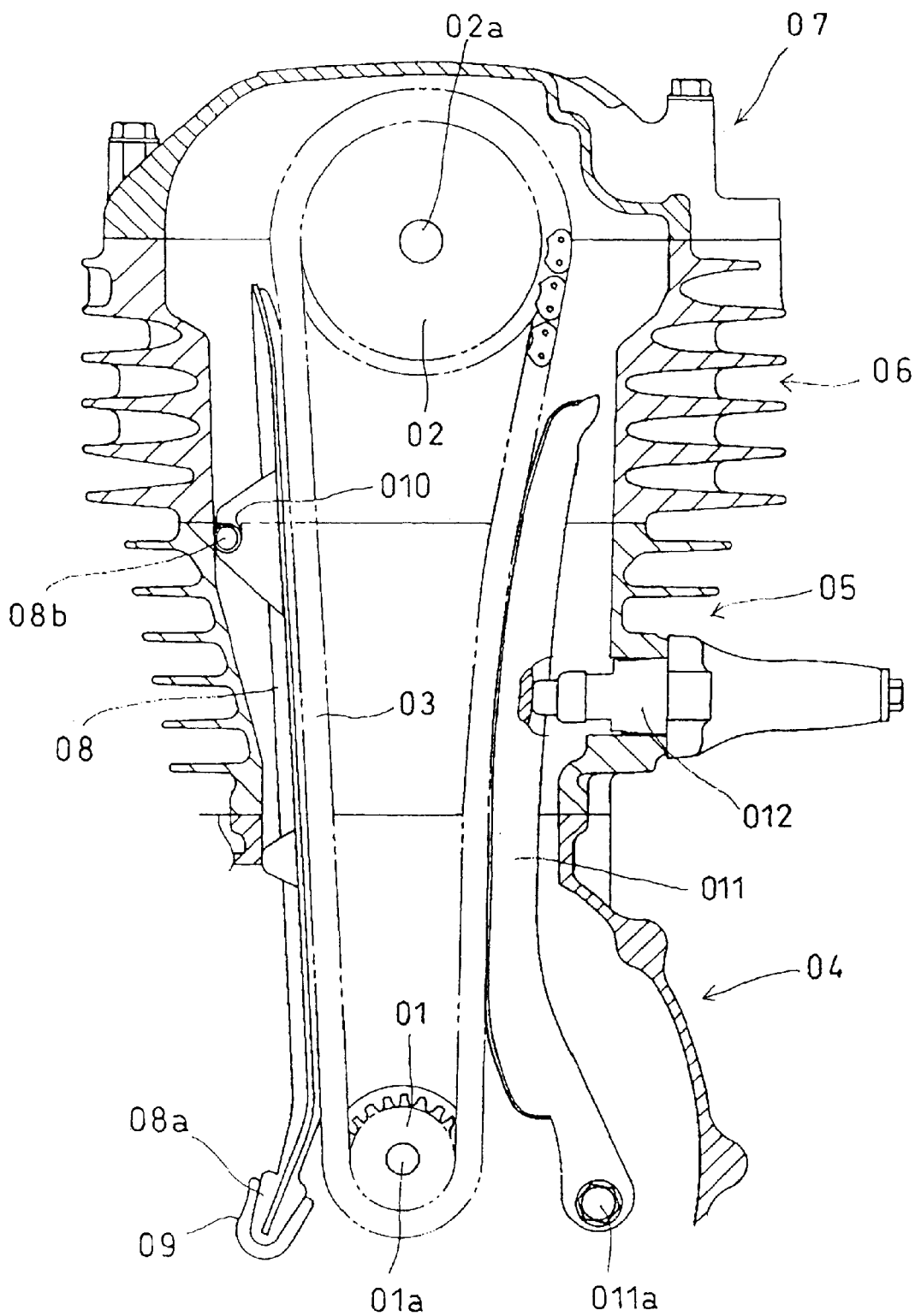
FIG. 13 is a front view illustrating one example of a cam chain and a chain guide of an internal combustion engine according to the background art.

After having passed through the narrow space B, when the chain guide 8 is somewhat inclined, as shown in FIG. 11, to lower the cylinder block 5, the second protrusion 8b of the chain guide 8 is captured in the widely opened second locating groove 10 and moved into the second locating groove 10. When the cylinder block 5 is stood her lowered, the second protrusion 8b is guided along the oblique surface of the second locating groove 10 so that the chain guide 8 is gradually inclined and finally settled at a predetermined position as s shown in FIG. 12.

Thereafter, when the cylinder block 5 is fixed to the crank casing 4 by means of a bolt or the like not shown, the chain guide 8 is also fixed in a predetermined position at a predetermined angle.

In the present embodiment, since the second locating groove 10 is provided in the lower surface of the cylinder block 5, the position of the cam shaft 2a is low, and setting of a position of the second locating groove 10 is facilitated despite being greatly deviated from the portion of the internal combustion engine directly above the crank shaft 1a.

Furthermore, since the second locating groove 10 is gradually enlarged toward the opening from the inner fixed position of the second protrusion 8b, when the chain guide 8 and the cylinder block 5 are mounted, when the cylinder block 5 is vertically hung down after passing by the location of interference, the second protrusion 8b of the chain guide 8 is easily captured in the second locating groove 10 and taken into the second locating groove 10. The second protrusion 8b is guided by the oblique surface gradually reduced of the second locating groove 10 and settled in a deep predetermined position. Accordingly, assembly is simple and easy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mounting device for a cam chain guide for an internal combustion engine, the internal combustion engine including a crank shaft and a cam shaft provided externally of a cylinder bore, wherein rotation of the crank shaft is transmitted to the cam shaft by a cam chain to operate an intake/exhaust valve through a push rod and a rocker arm, said mounting device comprising:

a first protrusion provided in a vicinity of a lower end of the cam chain guide, said first protrusion being fitted into a first locating groove provided in a vicinity of the crank shaft in a crank casing of the internal combustion engine; and a second protrusion provided in a vicinity of a an upper portion of the cam chain guide, said second protrusion being fitted into a second locating groove provided in a lower surface of a cylinder block of the internal combustion engine, said second locating groove being gradually enlarged from an innermost portion towards an opening thereof.

2. The mounting device for a cam chain guide for an internal combustion engine according to claim 1, wherein said first protrusion is directed substantially vertically downward when the cam chain guide is in a mounted position.

3. The mounting device for a cam chain guide for an internal combustion engine according to claim 1, wherein said second protrusion includes two portions, each of said two portions protruding from opposite sides of the cam chain guide.

4. The mounting device for a cam chain guide for an internal combustion engine according to claim 2, wherein said second protrusion includes two portions, each of said two portions protruding from opposite sides of the cam chain guide.

5. The mounting device for a cam chain guide for an internal combustion engine according to claim 1, wherein said second locating groove includes at least one wall extending substantially obliquely vertically from a lower horizontal surface of the cylinder block.

6. The mounting device for a cam chain guide for an internal combustion engine according to claim 2, wherein said second locating groove includes at least one wall extending substantially obliquely vertically from a lower horizontal surface of the cylinder block.

7. The mounting device for a cam chain guide for an internal combustion engine according to claim 3, wherein said second locating groove includes at least one wall extending substantially obliquely vertically from a lower horizontal surface of the cylinder block.

8. The mounting device for a cam chain guide for an internal combustion engine according to claim 4, wherein said second locating groove includes at least one wall extending substantially obliquely vertically from a lower horizontal surface of the cylinder block.

9. An internal combustion engine, comprising:
a cylinder block having a cylinder bore therein;
a crank casing;
a crank shaft and a cam shaft provided externally of said cylinder bore;
a cam chain for transmitting rotation of said crank shaft to said cam shaft to operate an intake/exhaust valve through a push rod and a rocker arm;
a cam chain guide; and
a mounting device for said cam chain guide, said mounting device comprising:
  a first protrusion provided in a vicinity of a lower end of said cam chain guide, said first protrusion being fitted into a first locating groove provided in a vicinity of said crank shaft in said crank casing; and
  a second protrusion provided in a vicinity of a an upper portion of said cam chain guide, said second protrusion being fitted into a second locating groove provided in a lower surface of said cylinder block, said second locating groove being gradually enlarged from an innermost portion towards an opening thereof.

10. The internal combustion engine according to claim 9, wherein said first protrusion is directed substantially vertically downward when said cam chain guide is in a mounted position.

11. The internal combustion engine according to claim 9, wherein said second protrusion includes two portions, each of said two portions protruding from opposite sides of said cam chain guide.

12. The internal combustion engine according to claim 10, wherein said second protrusion includes two portions, each of said two portions protruding from opposite sides of said cam chain guide.

13. The internal combustion engine according to claim 9, wherein said second locating groove includes at least one wall extending substantially obliquely vertically from a lower horizontal surface of said cylinder block.

14. The internal combustion engine according to claim 10, wherein said second locating groove includes at least one wall extending substantially obliquely vertically from a lower horizontal surface of said cylinder block.

15. The internal combustion engine according to claim 11, wherein said second locating groove includes at least one wall extending substantially obliquely vertically from a lower horizontal surface of said cylinder block.

16. The internal combustion engine according to claim 12, wherein said second locating groove includes at least one wall extending substantially obliquely vertically from a lower horizontal surface of said cylinder block.

17. A method of mounting a cam chain guide in an internal combustion engine, the internal combustion engine including a crank shaft and a cam shaft provided externally of a cylinder bore, wherein rotation of the crank shaft is transmitted to the cam shaft by a cam chain to operate an intake/exhaust valve through a push rod and a rocker arm, said method comprising the steps of:
providing a first protrusion in a vicinity of a lower end of the cam chain guide;
providing a first locating groove in a vicinity of the crank shaft in said crank casing;
fitting the first protrusion into the first locating groove;
providing a second protrusion in a vicinity of a an upper portion of the cam chain guide;
providing a second locating groove in a lower surface of the cylinder block, said second locating groove being gradually enlarged from an innermost portion towards an opening thereof; and
fitting the second protrusion into the second locating groove.

18. The method according to claim 17, further comprising the steps of:
standing the cam chain guide upright, substantially vertically, to pass a top end of the cam chain guide through a narrow space adjacent an inner wall of the cylinder block;
capturing the second protrusion by a substantially vertical, obliquely extending wall of the second locating groove;
guiding the second protrusion along the obliquely extending wall to set the second protrusion within the second locating groove.

* * * * *